Figures 1, 2, 3:
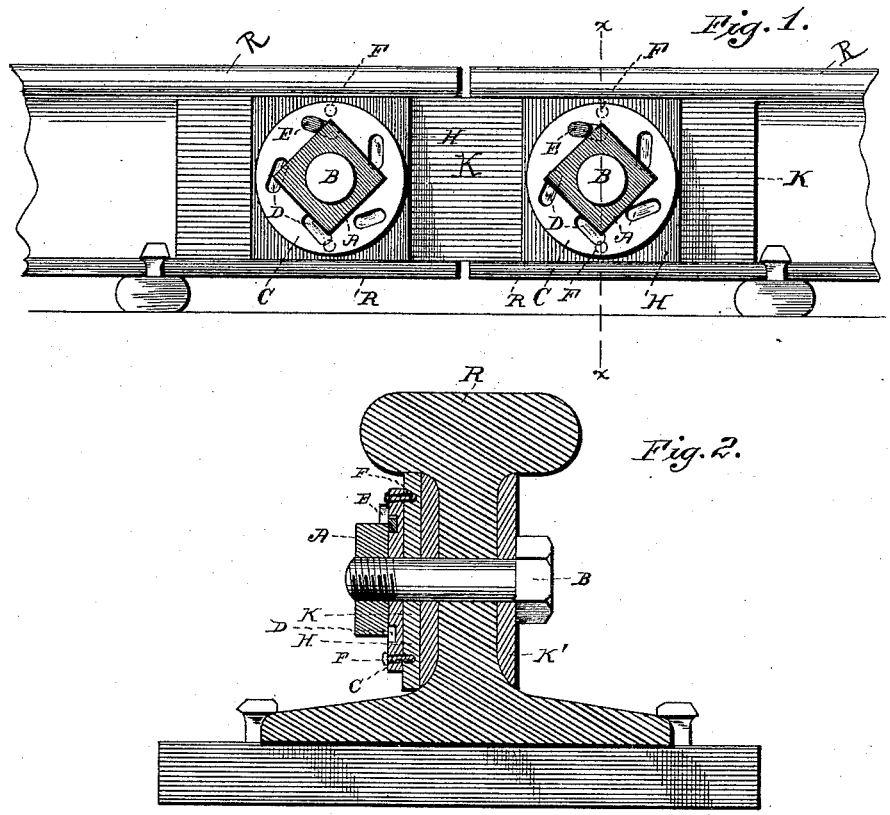

(No Model.)

J. W. B. COOK.
NUT LOCK.

No. 452,945. Patented May 26, 1891.

Witnesses
N. B. Harris
John C. Wilson

Inventor
John W. B. Cook

By Whitman & Wilkinson
Attorneys

UNITED STATES PATENT OFFICE.

JOHN W. B. COOK, OF CAMDEN, ARKANSAS, ASSIGNOR OF ONE-HALF TO DANIEL W. BRUMMETT, OF SAME PLACE.

NUT-LOCK.

SPECIFICATION forming part of Letters Patent No. 452,945, dated May 26, 1891.

Application filed December 26, 1890. Serial No. 375,803. (No model.)

*To all whom it may concern:*

Be it known that I, JOHN W. B. COOK, a citizen of the United States, residing at Camden, in the county of Ouachita and State of Arkansas, have invented certain new and useful Improvements in Nut-Locks; and I do hereby declare the following to be a full, clear, and exact description of the invention, such as will enable others skilled in the art to which it appertains to make and use the same.

My invention relates to nut-locks, and is designed to provide a nut-lock which can be cheaply and easily applied, and which will securely hold the nut against unscrewing.

With many of the forms of nut-locks now in use the elasticity of a spring has to be overcome in screwing up, greatly increasing friction, while in unscrewing the said spring bites into the nut, making it difficult to remove the nut for any purpose.

In many other forms of nut-locks the device is either complex in use or expensive in manufacture.

My nut-lock is an exceedingly cheap and convenient device, and has worked well in practice. While the said nut-lock is applicable in all cases where screw-bolts are subjected to jarring strains, I shall describe it as applied to making the joints of rails.

Reference is had to the accompanying drawings, wherein—

Figure 1 is a vertical projection of a portion of a rail and fish-plate, showing my device. Fig. 2 is a vertical section along the line $x$ $x$ of Fig. 1. Fig. 3 is a perspective view of my locking-key.

A represents the nut; B, the bolt; C, a flat ring-washer having rectangular holes D with semi-cylindrical ends. While I have shown five of these holes, any convenient number more than one, differing from the number of sides of the nut, may be used.

E represents the key, symmetrical in shape, the two arms $e^3$ and $e^{3\prime}$ being reversible and the faces $e$ and $e'$ and $e^2$ and $e^{2\prime}$ exactly alike. The depth of each arm of the key is just equal to the thickness of the washer.

F and F represent two pins passing through holes $c$ in the washer C and penetrating the washer-plate H. The function of these two pins and the washer-plate is to keep the washer from turning; but an angular washer may be used on railroads adapted to fit snugly between the upper and lower flanges of the rails, and thus the washer-plate may be done away with. Moreover, when the washer goes over wooden timbers spikes may be used to hold the washer against turning, and the washer-plate may be dispensed with. K and K′ represent the fish-plates and R the rail.

The operation of my device is as follows: After the bolt is in place, put on the washer-plate and secure the washer thereto by the pins F F. Then screw down on the nut, and when it is home insert the key in the nearest hole to a backing corner of the nut and turn the nut back over the arm of the key sunk in the washer. This locks both the nut and key. At any time if the nut becomes loose from wear, screw up the nut and insert the key in the hole nearest to a backing corner of the nut, as before. It will be noted that by having the two arms $e^3$ and $e^{3\prime}$ of the key E at right angles to the stem, and symmetrical, the lower face $e'$ of the upper arm bears against the upper surface of the washer, and since the upper face $e$ of the lower arm bears against the bottom of the nut it will be impossible to bend the said stem outward without breaking it, or to round the edge of the hole in the washer, while at the same time the key will be firmly set with a very little back-pressure. Moreover, by having the two arms symmetrical and reversible no time will be lost in adjusting the key, and since there are two available arms flaws due to the manufacture or wear of the keys will not be so important as if there were only one arm and any great nicety of fit required. By having a plurality of holes differing in number from the sides of the nut I get a vernier effect, and always have one hole close to an angle of the nut. This would not be the case were I to have one hole or a number of holes symmetrically arranged, equal to the number of sides of the nut.

Having thus described my invention, what I claim, and desire to secure by Letters Patent of the United States, is—

1. In a nut-lock, the combination, with a polygonal nut, of a washer held against turning, a hole or holes in said washer, and a key having two reverse symmetrical arms, each attached to a vertical stem and equal in height to the thickness of the washer, one arm adapted to lie under the nut and be held thereby, the other arm locking the nut, and each arm adapted to fit into the said hole or holes, substantially as described.

2. In a nut-lock, the combination, with a polygonal nut, of a washer held against turning and having a plurality of holes symmetrically arranged about the nut and differing by one from the number of sides of the nut, and a key having two reverse symmetrical arms each equal in height to the thickness of the washer and attached to a vertical stem, each of said arms adapted to fit into the said holes in the washer, one arm adapted to lie under the nut and be held thereby, and the other arm locking the nut, substantially as described.

In testimony whereof I affix my signature in presence of two witnesses.

JOHN W. B. COOK.

Witnesses:
PRESTON AVERA,
J. H. GRAYSON.